April 18, 1961

D. L. HYMER 2,979,824

GAUGE FOR MEASURING THE OUTLET DIAMETER OF
INTERNALLY TAPERED ELEMENTS

Filed Dec. 31, 1959

Donald L. Hymer,
INVENTOR.

BY S. J. Rotondi,
A. T. Dupont, and
Alvin E. Moore,
ATTORNEYS.

April 18, 1961

D. L. HYMER 2,979,824

GAUGE FOR MEASURING THE OUTLET DIAMETER OF INTERNALLY TAPERED ELEMENTS

Filed Dec. 31, 1959

Donald L. Hymer
INVENTOR.

BY S. J. Rotondi,
A. T. Dupont, and
Alvin E. Moore,

ATTORNEYS.

United States Patent Office 2,979,824
Patented Apr. 18, 1961

2,979,824
GAUGE FOR MEASURING THE OUTLET DIAMETER OF INTERNALLY TAPERED ELEMENTS
Donald L. Hymer, 1706 Bierne Ave., Huntsville, Ala.
Filed Dec. 31, 1959, Ser. No. 863,368
1 Claim. (Cl. 33—143)
(Granted under Title 35, U.S. Code (1952), sec. 266)

My invention may be manufactured and used by or for the Government for governmental purposes without the payment of any royalty thereon.

This invention relates to a gauge for measuring the outlet diameter of internally tapered elements.

In the fabrication of parts comprising tapered portions which are subjected to a high degree of accuracy, such as the taper of a rocket nozzle, there is a need for a gauge which will accurately measure the taper. Also, there is a need for a precision gauge of this type which may be easily and quickly adjusted for measuring the outlet diameter.

In view of these facts, an object of this invention is to provide a taper outlet diameter gauge having a high degree of accuracy.

Another object is to provide such a gauge which is easily and quickly adjusted to the proper position for measuring the taper.

The foregoing and other objects of the invention will become more fully apparent from the following detailed description of the preferred embodiments of the invention and from the accompanying drawings, in which.

Figure 1:
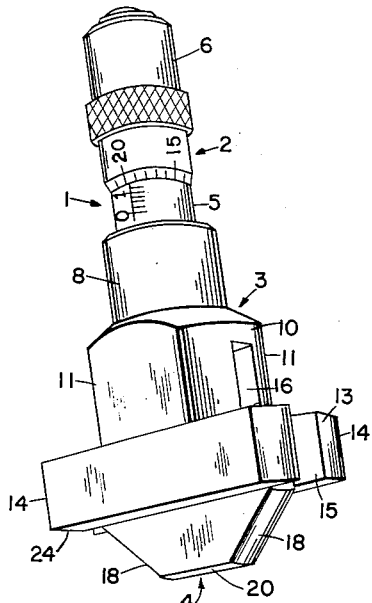
Figure 1 is a perspective view of one of the embodiments of the invention.
Figure 2:
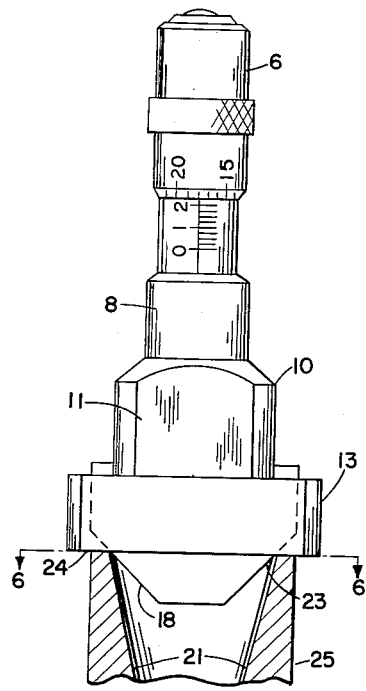
Figure 2 is an elevational view showing the embodiment of Figure 1 in measuring position on an internally tapered element.

In the embodiment shown in Figure 1, the numeral 1 designates a taper outlet gauge.

This gaue is divided into three main elements comprising a depth-micrometer, measurement-indicating part 2, a measuring plug alignment element 3, and a measuring plug 4.

The measurement indicating element comprises a stationary member 5 and a movable member 6. These members are calibrated and arranged in a known manner.

The plug alignment element is substantially T-shaped. The vertical portion of the T-shaped element comprises a reduced portion 8, provided with a central bore 9, adapted to be secured to a stationary portion 5 of said measurement indicating element, an enlarged portion 10, integral with said reduced portion, having a pair of flat sides 11, and an axial bore 12 extending thru the part.

The horizontal portion 13 of the T-shaped element is integrally connected with said enlarged portion 10, so that the flat sides 14 of the horizontal portion are in the same planes as the flat sides of said enlarged portion. Horizontal portion 13 is provided with a slot 15 which is perpendicular to said central bore. Slot 15 divides the horizontal portion into two parts and extends into the enlarged portion, forming a second slot 16 in the enlarged portion.

The two portions of the plug alignment element are interconnected by axial bore 12 and slots 15 and 16. Bore 12 also interconnects with the interior of the measurement indicating section.

Figure 4:
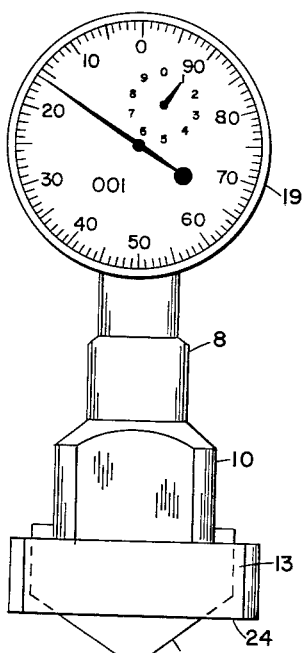
Figure 4 is an elevational view of another embodiment of the invention.
Figure 3:
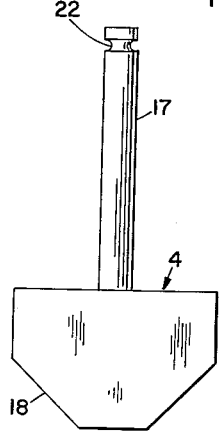
Figure 3 is an elevational view of the measuring plug used in Figures 1 and 2.
Figure 5:
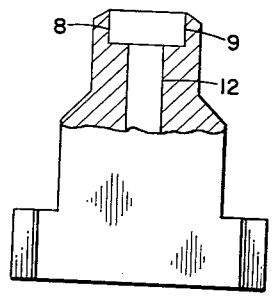
Figure 5 is an elevational view partly in section, of the plug alignment element used in the two embodiments.
Figure 6:
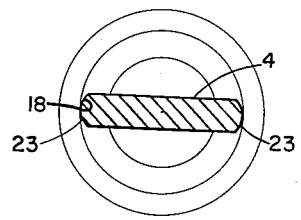
Figure 6 is a detailed, sectional view from the plane 6—6 of Figure 2.
Figure 7:
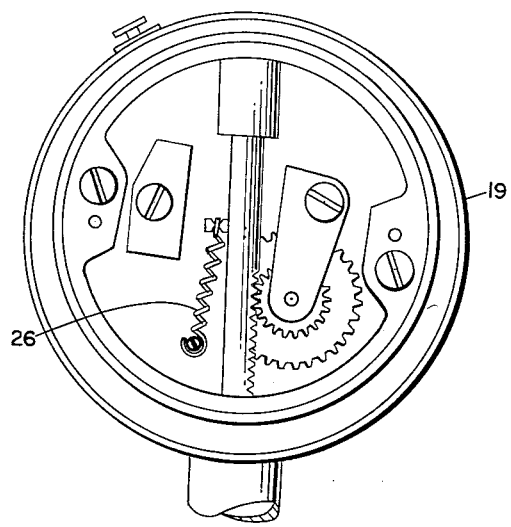
Figure 7 is a rear elevational view of the device of Figure 4, with the rear cover plate of the dial-type indicator having been detached.

Measuring plug 4 is adapted to slidably fit between the two parts of portion 13 until it abuts the base of the slot 16. The preferred shape of the lower part of plug 4 is substantially triangular, as shown in Figure 4, but it may be other shapes, such as the truncated triangle shown in Figure 3. Plug 4 has a round stem 17 integrally connected to it, which is adapted to fit axial bore 12. The end of stem 17 freely abuts movable member 6 of the measurement indicating section, or alternatively, is connected to movable member 6 by a snap ring which fits in annular recess 22. With either of the above arrangements, rotation of member 6 will move plug 4 into contact with the taper 21. The portions 18 of the plug that contact the outlet of the internal cone preferably have arcuate surfaces as indicated in Figure 6. The radius of curvature of the arc of each of surfaces 18 is shorter than the radius of curvature of the outlet circumference of the internal cone, so that only a point of each surface 18 contacts said circumference.

The sides 18 of the lower part of the plug form an angle between them that is greater than the angle between two opposite lines 21 formed by the intersection of a plane with the internal taper of the cone whose outlet is to be measured. Therefore the sides 18 may be lowered until they touch the internal circumference of the outlet of the conical taper at points 23. At the same time bottom surface 24 rests on the upper (or outer) surface of the internally tapered element 25.

When the gauge is fabricated it is calibrated for use with the specific included angle of the sides 18 of the plug, according to the tangent relation between the axial movement of the micrometer and the resulting change in the distance between the points of the sides 18 that engage points 23. For example, when a standard depth micrometer, which has not been recalculated, is used with a plug having an included angle of 90°, the micrometer will move .001 of an inch while the distance between contacting points of the plug increases .002 of an inch. Therefore, the diameter of the taper is twice the micrometer reading.

The operation of the gauge is as follows:

A calibrated gauge having an included angle greater than the included angle of the internally tapered portion is selected.

The plug alignment element 3, of the calibrated gauge, is placed so that it spans the taper. Surfaces 24 are held on the edge of the taper; and movable member 6, of the micrometer-type, measurement-indicating element is rotated until the plug contacting portions engage the circumference of the tapered outlet at 23. At this point, a visual inspection is made thru the ends of slot 15 and from either, or both, of the flat sides of the horizontal portion, to insure that surfaces 24 and the plug-contacting portions are properly seated.

When portions 18 are thus in engagement with the taper the gauge is slightly rotated back and forth a few times, so as to insure that the plug is properly seated. When the plug is thus seated the diameter of the taper may be read from the micrometer.

In the embodiment shown in Figure 4 the micrometer-type, measurement-indicating element is replaced by a gauge 19 comprising a dial type of indicator. This gauge has a counter clockwise dial. It is similar to a known type of dial indicator, except that it is calibrated for use with taper-engaging element 4 and its stem is fixed to element 4.

The remainder of the embodiment of Figure 4 has the same structure as the first embodiment, and like reference numerals indicate parts common to both forms. However, the device of Figure 4 provides a simpler means of obtaining the reading. The plug is forced outward from elements 8 and 10 by means of spring 26 until the reading of the dial is at its maximum. The dial of Figure 4, for example, has a maximum reading of ten thousandths, when the two pointers are at zero and the plug is forced outward.

In use the sides 18 of the taper-engaging plug are manually forced toward part 8—10, while the large dial moves in a clockwise direction and the small dial moves in a counter-clockwise direction until surface 24 contacts the outer edge of the flaring cone. At this point a reading of the length of the diameter of the outlet of the taper is made.

Although the forms of the invention that are herein shown and described are preferred embodiments, various changes in the shape, size and arrangement of parts may be resorted to without departing from the spirit of the invention, or the scope of the subjoined claim.

The following invention is claimed:

A gauge for measurement of the outlet diameter of an internally tapered element, comprising: a micrometer-type, measurement-indicating element, having a stationary portion and a movable portion; a substantially T-shaped element, comprising a vertical base portion and a horizontal portion integral with said vertical portion, said base portion having a central bore adapted to receive a part of said stationary portion, an enlarged part having a slot perpendicular to said bore, a pair of flat outer sides, and an axial bore connecting said first-named bore and said slot, said horizontal portion being provided with a slot in alignment with said first-named slot and a pair of flat outer sides joining, and in the same planes as, said first-named sides; a measuring plug adapted to slidably fit in said slots, the lower part of said plug having two flat sides that fit in said slots and two other sides that form an angle that is greater than the angle between two sides of said internally tapered element, each of said two other sides having an arcuate surface with a radius that is smaller than the radius of the outlet of said tapered element, the upper part of said plug being wider than said slot in said vertical base portion and narrower than said slot in said horizontal portion; a cylindrical stem centrally connected to said plug, said stem being of a size adapted to fit said axial bore and of a predetermined length to extend thru said T-shaped element and into said measurement-indicating element and engagement with said movable portion, whereby movement of said movable portion will move said plug into measuring position with the outlet of said tapering element.

References Cited in the file of this patent

UNITED STATES PATENTS

| | | |
|---|---|---|
| 1,396,117 | Iliff | Nov. 8, 1921 |
| 2,316,877 | Maag | Apr. 20, 1943 |
| 2,600,498 | Hammerly et al. | June 17, 1952 |
| 2,631,378 | Wynne | Mar. 17, 1953 |
| 2,758,383 | Breit | Aug. 14, 1956 |
| 2,801,472 | Davidiak et al. | Aug. 6, 1957 |
| 2,801,474 | Field et al. | Aug. 6, 1957 |
| 2,844,881 | Stunkel | July 29, 1958 |